UNITED STATES PATENT OFFICE.

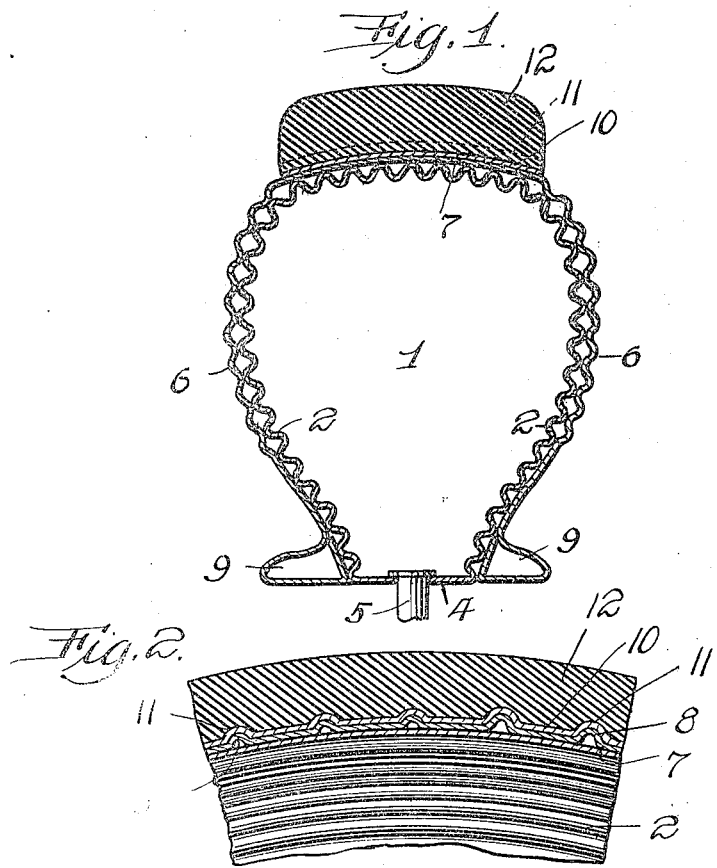

CHARLES H. LAPPE, OF PITTSBURGH, PENNSYLVANIA.

TIRE.

1,070,044. Specification of Letters Patent. Patented Aug. 12, 1913.

Application filed August 12, 1912. Serial No. 714,596.

*To all whom it may concern:*

Be it known that I, CHARLES H. LAPPE, a citizen of the United States of America, residing at Pittsburgh, in the county of Allegheny and State of Pennsylvania, have invented certain new and useful Improvements in Tires, of which the following is a specification, reference being had therein to the accompanying drawing.

This invention relates to tires, for automobiles and other vehicles, and has special reference to an improvement in pneumatic tires, whereby the same shall possess, to the highest degree attainable, a maximum strength, integrity, resiliency, endurance, and yielding wearing face for tread, together with maximum resistance against perforation.

A further object of the invention is to provide a novel construction of vehicle tire built up in such a manner as to not only effect a great saving in rubber, but at the same time to secure an exceptionally tough and cushioned body and tread, producing a tube of great strength and wearing capacity, and particularly obviating the possibility of "blow outs" resulting from high internal pneumatic pressure, and also, at times, from the injury termed "stone bruise."

Another and distinctive object of the present invention is to provide expansible inner and outer tubes made of metal, the outer tube having provision whereby a tread can be easily secured to the outer tube.

A still further object of this invention is to provide a resilient metallic tire that is inexpensive to manufacture, and capable of withstanding the wear, tear and strain imposed upon pneumatic tires in the ordinary use thereof upon motor and other vehicles.

With the above and other objects in view the invention resides in the novel construction, combination and arrangement of parts to be hereinafter specifically described and then claimed.

The essential features of the invention, involved in carrying out the objects above indicated, are necessarily susceptible to a wide range of structural modification without departing from the spirit or sacrificing any of the advantages of the invention, but a practical embodiment thereof is suggested in the accompanying drawing, in which:—

Figure 1 is a cross sectional view of a tire in accordance with this invention. Fig. 2 is a longitudinal sectional view of a portion of the tire, and Fig. 3 is a perspective view of a portion of the tire.

Further describing my invention in detail with reference to the drawing, wherein like numerals denote corresponding parts throughout: 1 generally denotes an inner expansible tube made of a strip of longitudinally corrugated or fluted resilient metal. The strip of metal can be produced by a rolling process and then bent to form the tube. The metal is of a tenacious nature and is thin whereby the corrugations or flutes 2 thereof will be susceptible to air pressure within the tube. In other words, the inner tube, when deflated has the walls of the corrugations close together or collapsed, and when inflated the walls of the corrugations are separated and the inner tube expanded to that degree as to form a cushion for a weight supported by the tire. The longitudinal edges of the inner tube are flattened, as at 4 and placed together to afford a sufficient bearing surface of said inner tube upon the rim or felly of a wheel. Any suitable fastening means can be resorted to for securing the inner tube to a wheel and the inner tube is provided with a valve 5 whereby it can be filled and inflated by air.

6 denotes an outer tube made of material similar to the inner tube. The outer tube has corrugated side walls and a smooth tread surface 7 that is provided with transverse ribs 8 formed by depressing the inner side of the tread 7, these ribs being equally spaced and affording means for securing a tread to the surface 7 without any danger of the tread shifting circumferentially of the outer tube. The longitudinal edges of the outer tube are bent to form hollow flanges 9 that permit of the clencher type of fastener being used for securing the outer tube to a wheel. The hollow flanges 9 are formed by bending the edges of the outer tube outwardly at an angle, then inwardly in a horizontal plane and then upwardly until the edges meet the outer tube. Suitably mounted upon the tread surface 7 is a tread plate 10 having transverse depressions 11 to receive the ribs 8, said depressions also providing ribs that engage in a resilient tread 12, preferably made of rubber. The outer tube fits upon the inner tube and the corrugations thereof are retractable with the corrugations of the inner tube, and both of said tubes coöperate in forming a yieldable tire body that eliminates to a great degree the use of rubber for cushioning purposes. The rubber tread 12 is simply employed for preventing sharp stones from piercing or penetrating the tread surface 7, and with both of said tubes made of durable metal the liability of punctures and blow-outs is reduced to a minimum.

It is thought that the utility of the tire will be apparent without further description, and I reserve the right to make such changes in the form, proportion and minor details of construction as fall within the scope of the appended claims.

What I claim is:—

1. A tire comprising inner and outer tubes formed of sheet metal, said inner tube having a flat base and its remaining portion longitudinally corrugated throughout, said outer tube being split and bent upon itself to provide its ends with outwardly projecting flanges, said outer tube having its sides longitudinally corrugated and further including a flat tread surface, the corrugations of the outer tube being alternately disposed with respect to the corrugations of the inner tube, said inner tube positioned with respect to the outer tube whereby the crest of the outer corrugations of the inner tube will abut against the crest of the inner corrugations of the outer tube.

2. A tire comprising inner and outer tubes formed of sheet metal, said inner tube having a flat base and its remaining portion longitudinally corrugated throughout, said outer tube being split and bent upon itself to provide its ends with outwardly projecting flanges, said outer tube having its sides longitudinally corrugated and further including a flat tread surface, said tread surface formed with transversely extending ribs providing means for securing a tread to said surface, the corrugations of the outer tube being alternately disposed with respect to the corrugations of the inner tube, said inner tube positioned with respect to the outer tube whereby the crest of the outer corrugations of the inner tube will abut against the crest of the inner corrugations of the outer tube.

In testimony whereof I affix my signature in the presence of two witnesses.

CHARLES H. LAPPE.

Witnesses:
MAX H. SROLOVITZ,
KATHERINE ERRETT.